United States Patent [19]

Nakamura et al.

[11] Patent Number: 4,525,826
[45] Date of Patent: Jun. 25, 1985

[54] OPTICAL TRACK POSITION DETECTING APPARATUS AND OPTICAL INFORMATION PROCESSOR USING THE SAME

[75] Inventors: Shigeru Nakamura, Hachioji; Yoshito Tsunoda, Mitaka; Kazuo Shigematsu, Saitama; Toshimitsu Kaku, Hachioji; Takeshi Maeda, Kokubunji; Tsuyoshi Kato, Hachioji, all of Japan

[73] Assignee: Hitachi, Ltd., Tokyo, Japan

[21] Appl. No.: 402,234

[22] Filed: Jul. 27, 1982

[30] Foreign Application Priority Data

Sep. 28, 1981 [JP] Japan ................. 56-152086

[51] Int. Cl.³ .............................................. G11B 7/00
[52] U.S. Cl. ..................................................... 369/46
[58] Field of Search ................. 369/109, 44, 45, 46, 369/110, 120; 250/201, 570

[56] References Cited

U.S. PATENT DOCUMENTS

| | | | |
|---|---|---|---|
| 3,963,862 | 6/1976 | Bouwhuis | 369/46 |
| 4,006,293 | 2/1977 | Bouwhuis et al. | 369/46 |
| 4,065,786 | 12/1977 | Stewart | 369/46 |
| 4,242,579 | 12/1980 | Bouwhuis | 369/109 |
| 4,349,901 | 9/1982 | Howe | 369/46 |
| 4,446,548 | 5/1984 | Bouwhuis et al. | 369/109 |

*Primary Examiner*—Donald McElheny, Jr.
*Attorney, Agent, or Firm*—Antonelli, Terry & Wands

[57] ABSTRACT

In an optical information processor such as an optical disc apparatus, when a light beam is irradiated to a plurality of tracks on an information recording medium, the plurality of tracks act as a diffraction grating. Areas in which light receiving parts of a light detector are arranged are determined by a track pitch, a wavelength and a numerical aperture of a condenser lens so that the light detector detects only a change in a light intensity due to an interference between a 0-order diffracted light ray and a 1-order diffracted light ray.

5 Claims, 11 Drawing Figures

OPTICAL TRACK POSITION DETECTING APPARATUS AND OPTICAL INFORMATION PROCESSOR USING THE SAME

The present invention relates to an optical track position detecting apparatus used in an optical information processor for optically recording and for reproducing information such as an optical disc apparatus, for detecting a positioning error between a selected one of tracks distributed on a surface of an information recording medium and a light spot.

In the prior art optical disc apparatus, the positioning error between a center position of the light spot and a center position of a guide groove (track) is detected by a differential output signal of a 2-divided light detector which equally splits a flux of reflected light from the track, based on the fact that a peak of a light intensity distribution of the reflected light from the track is deflected toward the direction of the tracking error. In order to detect the tracking error at a high detection sensitivity and with a small detection error, the width of a dead zone in the 2-divided light detector is reduced to obtain a necessary detection sensitivity.

However, as a recording density of information increases, a track pitch is reduced and the light spot strikes to adjacent tracks. As a result, a repetitive track pattern acts as if it were a diffraction grating so that the tracking error results in a significant interference effect between a 0-order diffracted light ray and ±1-order diffracted light rays.

As a result, a change in the light intensity distribution due to the tracking error is caused more significantly by a change in the intensity due to the interference in each of overlap areas of the 0-order diffracted light ray and the ±1-order diffracted light rays than by a change in the peak position. Thus, it is difficult to stably detect the tracking error by the prior art light detector.

If the light spot is moved for tracking, the reflected light on the plane of the light detector swings and the swing is reflected to a tracking error signal. As a result, it is difficult to precisely detect the tracking error.

It is an object of the present invention to provide an optical track position detecting apparatus which is hardly affected by a fine structure of a reflection surface of a disc, an asymmetry of a track groove shape and a misalignment of an optical axis of a reflected light and which can provide a stable and correct tracking error signal even when a track pitch is smaller than a diameter of a light spot.

In order to achieve the above object, the present invention is characterized in that at least two light receiving parts of a light detector are located in overlap areas of the 0-order diffracted light ray and the ±1-order diffracted light rays in the reflected light from a track so that the light detector detects only the change in the light intensity due to the interference of the 0-order light ray and the ±1-order light rays.

The embodiments of the present invention will now be described in conjunction with the accompanying drawings, in which.

Figure 1:
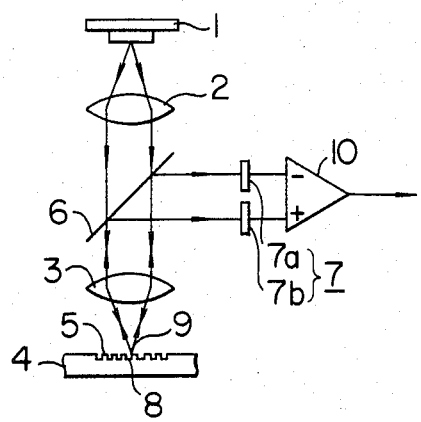
FIG. 1 shows a schematic construction of an optical track position detecting apparatus of the present invention.

FIG. 1 shows a schematic construction of an optical track position detecting apparatus of the present invention invention. Light fluxes emitted from a semiconductor laser 1 are collimated by a lens 2, pass through a half-mirror 6 and a condenser lens 3 and are focused onto an information recording surface 5 of a rotating disc 4. The information recording surface 5 is provided with tracks 8. When a light spot 9 impinges on one of the tracks 8, a diffraction pattern is created in a reflected light from the track. The reflected light is collimated by the condenser lens 3 and reflected by the half-mirror 6 and it is received by a light detector 7 having two light receiving parts 7a and 7b which are arranged symmetrically with respect to the track direction (which is normal to a plane of drawing in the illustrated embodiment) to laterally sandwitch the track. Electrical output signals from the light receiving parts 7a and 7b are supplied to a differential amplifier 10 which detects a difference therebetween to produce a tracking error signal. By moving the light spot 9 perpendicularly to the track direction in accordance with the tracking error signal, the light spot is controlled to follow the center of the track. Means for moving the light spot may be known means such as means for moving only the condenser lens by supplying the tracking error signal to an actuator attached around the condenser lens or means for moving a whole optical head having the semiconductor laser 1, the lens 2, the half-mirror 6, the condenser lens 3 and the light sensors 7a and 7b mounted in a housing.

A principle of the detection of the tracking error signal in accordance with the present invention is now explained.

Figure 2:
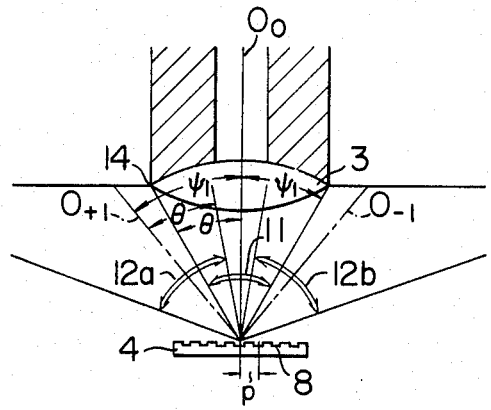
FIG. 2 shows a emissions of 0-order light ray and ±1-order diffraction light rays.
Figure 3:
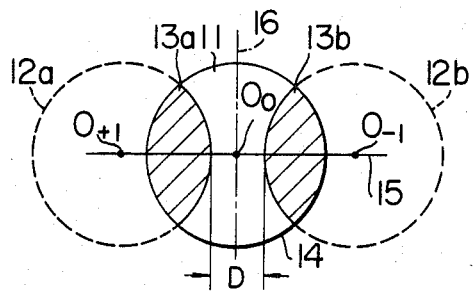
FIG. 3 show an example of a region used to detect a tracking error detection light.
Figure 4:
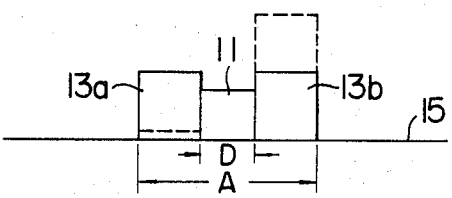
FIG. 4 shows a change in a light intensity distribution of the detection light.

In the present invention, the tracking error signal is detected by the interference effect of the 0-order diffracted light ray and the ±1-order diffracted light rays due to the plurality of tracks which act as if they were a diffraction grating. FIG. 2 shows a sectional view normal to the track direction which illustrates the emission of the 0-order and ±1-order diffracted light rays, in which $$\frac{\lambda}{2(N.A.)\sqrt{1-(N.A.)^2}} < P \leq \frac{\lambda}{(N.A.)},$$

where P is a spacing of the tracks 8 (track pitch), N.A. is a numerical aperture of the condenser lens 3 and $\lambda$ is a light wavelength. Numerals 11, 12a and 12b denote regions of 0-order, +1-order and −1-order diffracted light rays. Optical axes $0_{+1}$ and $0_{-1}$ of the ±1-order diffracted light rays make an angle $\psi_1$ which is defined by $P \sin \psi_1 = \lambda$ with an optical axis $0_o$ of the 0-order diffracted light ray, and the respective diffracted light rays are directed in regions having a solid angle $\theta$ which is determined by the respective central optical axes and the N.A.=$\sin \theta$ of the condenser lens 3. FIG. 3 shows as plan view of the aperture of the lens 3 taken from the top of FIG. 2. On the aperture plane, the ±1-order diffracted light ray regions 12a and 12b are elliptical in nature but they may be practically considered as circles centered at the respective optical axes $0_{+1}$ and $0_{-1}$. Hatched areas 13a and 13b show overlap areas of 11 and 12a, and 11 and 12b, and a spacing D between the areas 13a and 13b is given by $D/2 = A \cdot \tan(\Psi_1 - \theta)/2 \tan \theta$ (A: a diameter of the aperture 14 of the lens 3) since when the focal length of the lens 3 is f, D/2 is equal to $f \cdot \tan(\Psi_1 - \theta)$ and $f \cdot \tan \theta$ is equal to A/2 as is apparent from FIG. 2. Accordingly, a spacing between the optical axis $0_o$ of the 0-order diffracted light ray and the optical axis $0_{+1}$ of the +1-order diffracted light ray and a spacing between the optical axis $0_o$ of the 0-order diffracted light ray and the optical axis $0_{-1}$ of the −1-order diffracted light ray, which spacings are both equal to (D/2)+(A/2), are given by $$\left( \frac{\tan(\psi_1 - \theta)}{2 \tan \theta} + \frac{1}{2} \right) A,$$

respectively. When P=λ/(N.A.), $\psi_1 = 0$ and hence D=0. Thus, the area 13a contacts to the area 13b. The reflected light through the lens 3 is collimated and impinges to the light detector. Thus, the light on the surface of the light detector (hereinafter referred to as a detection light) has the same intensity distribution as that shown in FIG. 3 and distributes into three areas in the circle 14. The light intensities of the areas 13a and 13b change by the tracking error. Numeral 16 denotes a track axis which passes through the optical axis of the detection light. FIG. 4 shows a light intensity distribution on a line 15 shown in FIG. 3. An unbalance of light intensity distribution is created between the areas 13a and 13b by the tracking error as shown by a solid line profile and a broken line profile. In the present invention, in order to produce the tracking error signal, light receiving parts of the light detector are located within the areas 13a and 13b shown in FIG. 3 to detect only the change in the light intensity due to the interference of the 0-order diffracted light ray and the ±1-order diffracted light rays. If the light receiving parts of the light detector extend beyond the above areas, the light detector also detects a change in the light intensity due to factors other than the interference so that noises due to the fine structure of the disc reflection surface and an error due to the asymmetry of the track groove geometry are added to the tracking error signal and hence the stable detection of the tracking error is impeded. When $$P \leq \frac{\lambda}{2(N.A.) \sqrt{1 - (N.A.)^2}},$$

there exists no overlap area of the 0-order diffracted light ray and the ±1-order diffracted light rays.

Figure 5:
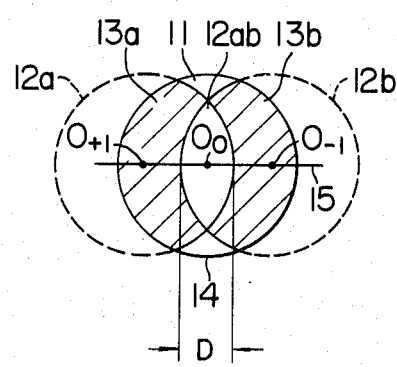
FIGS. 5 and 6 show other examples of the region used to detect the detection light.

When P>λ>(N.A.), the diffraction angle $\psi_1$ of the ±1-order diffracted light is smaller than $\theta$ and there exists an overlap area 12ab of the ±1-order diffracted light rays 12a and 12b as shown in FIG. 5. In this case, the area 12ab is excluded. When $\psi_1 < \theta$, the spacings between $0_o$ and $0_{+1}$ and between $0_o$ and $0_{-1}$ are again given by $$\left( \frac{\tan(\psi_1 - \theta)}{\tan \theta} + \frac{1}{2} \right) A.$$

In the above description, the detection light which impinges to the light detector is the collimated light, but the present invention is not limited to the collimated light. For example, a convex lens or a concave lens may be placed in front of the light detector to converge or diverge the detection light to reduce or expand the diameter of the detection light flux. In this case, the light intensity distribution on the surface of the light detector is the same as that of the collimated light and only the diameter of the detection light changes. Accordingly, the light detector used in the present invention has at least two light receiving parts arranged symmetrically with respect to the track direction and the light receiving parts are arranged within overlap areas of a circle having a diameter $\phi$ (where $\phi$ is a diameter of the detection light on the surface of the light detector) centered at the optical axis of the detection light and two circles having the diameter $\phi$ centered at two points spaced from the center of the first circle in the direction perpendicular to the track direction by $$\left( \frac{\tan(\psi - \theta)}{2 \tan \theta} + \frac{1}{2} \right) \phi,$$

which overlap area does not include an overlap area of those three circles. The light receiving parts may be of any shape so long as they are symmetric with respect to the track direction axis 16 and are within the areas 13a and 13b, although it is preferable for each part to have a large area from a standpoint of a detection sensitivity.

In accordance with the present invention, since the light detector detects only the interference between the 0-order diffracted light ray and the ±1-order diffracted light rays, the tracking error signal can be stably detected even when the track pitch is smaller than the light spot diameter.

Figure 6:
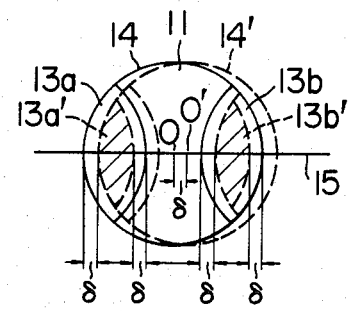
Figure 7:
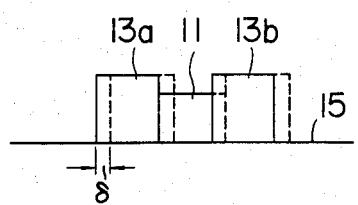
FIG. 7 shows a change in the light intensity distribution of the detection light due to a misalignment of an optical axis.

When the present invention is applied to an optical disc apparatus, the detection light may include a misalignment of the optical axis depending on particular tracking error control means. By way of example, means for moving only the condenser lens 3 to the direction of the tracking error in accordance with the detected tracking error signal. The circle 14 shown by a solid line in FIG. 6 is identical to that of the detection light shown in FIG. 3. If the lens 3 is displaced by $\epsilon$ to the right (for example, inwardly of the disc) along the line 15 to compensate for the tracking error, the detection light optical axis 0 is displaced by $\delta = 2\epsilon$ as shown by 0' and the detection light appears as shown by a broken line circle 14'. FIG. 7 shows a light intensity distribution on the line 15 of FIG. 6. A solid line profile shows the light intensity distribution without tracking error, and a broken line profile shows the light intensity distribution when the detection light is shifted to the right by $\delta$ by the rightward displacement of the condenser lens 3 by $\epsilon$. As seen from FIGS. 6 and 7, as the lens 3 is displaced rightward by $\epsilon$, the optical axis of the detection light is shifted to the right by $\delta = 2\epsilon$ and the overlap areas of the 0-order diffracted light ray and the ±-order diffracted light rays are shifted to the right by $\delta$. It should be understood that when the condenser lens 3 is displaced to the left (for example, outwardly of the disc), the detection light intensity distribution is shifted to the left by two times as much as the displacement of the lens and the overlap areas of the 0-order diffracted light ray and the ±1-order diffracted light rays are also shifted by the same distance.

Accordingly, when such tracking error correction means which causes the misalignment of the optical axis of the detection light is used, the hatched areas 13a and 13b shown in FIG. 3 are reduced because they are parallelly shifted by the displacement δ of the optical axis of the detection light. When the light receiving parts of the light detector are arranged within the hatched areas 13a' and 13b' shown in FIG. 6, only the change in the light intensity due to the interference of the 0-order diffracted light ray and the ±1-order diffracted light rays can be detected irrespective of the misalignment of the optical axis of the detection light. In the optical disc apparatus, a maximum misalignment $\delta_m$ of the optical axis of the detection light corresponds to a maximum off-center distance $d_m$ of the disc. Thus, the tracking error $\epsilon$ is equal to $\pm d_m/2$ and the maximum misalignment $\delta_m$ of the optical axis of the detection light is equal to $2\epsilon = \pm d_m$. Accordingly, the areas 13a' and 13b' are defined by the areas which are overlap areas of the circle having the diameter $\phi$ centered at the optical axis of the detection light and the two circles having the diameter $\phi$ centered at two points spaced oppositely from the center of the first circle in the direction perpendicular to the track direction by $$\left( \frac{\tan(\psi_1 - \theta)}{2 \tan \theta} + \tfrac{1}{2} \right) \phi$$

and do not include the overlap area of those three circles, and which are parallelly shifted by the maximum misalignment $\delta_m$ of the optical axis of the detection light, or the maximum off-center distance $d_m$ of the disc in case of the optical disc. The off-center distance of the optical disc is detected by directing a light beam to the rotating disc, sensing the reflected light by the light detector, passing the output through a low-pass filter to produce a signal which represents crossing of the light beam across the track during the disc rotation, detecting the number of tracks crossed by the light beam during one revolution of the disc based on the detected signal, and multiplying the number of tracks by the track pitch. Thus, the maximum off-center distance of the disc can be readily determined in advance.

Figure 8:
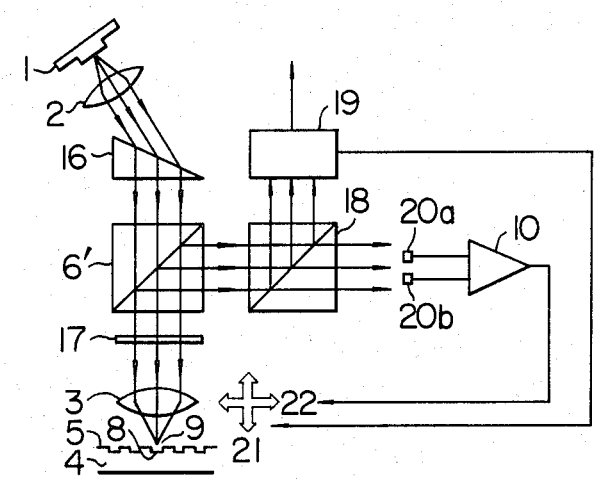
FIG. 8 shows one embodiment of an optical information reproducing apparatus which uses the present apparatus.
Figure 9:
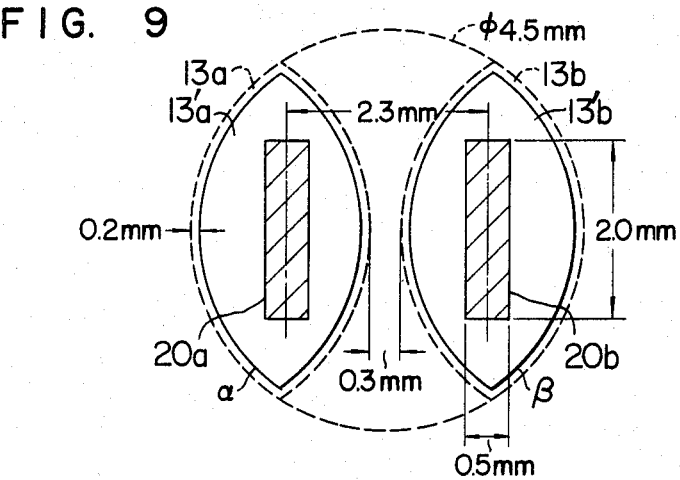
FIG. 9 shows one example of a light detector.

FIG. 8 shows one embodiment of an optical information reproducing apparatus which uses the optical track position detecting apparatus of the present invention, and FIG. 9 shows one example of the light detector used in the apparatus of FIG. 8. In the explanation for FIG. 8, those elements which are identical to FIG. 1 are omitted. Numeral 16 denotes a prism for converting a flat light intensity distribution of a laser beam emitted from the semiconductor laser 1 to an isometric light density distribution, numeral 6' denotes a polarizing beam splitter for taking out the reflected light from the disc, numeral 17 denotes a λ/4 or quarter wavelength plate, numeral 18 denotes a half-prism for separating a light from the polarizing beam splitter 6' and numeral 19 denote detection mans for detecting a defocusing signal and an information signal.

The detection means 19 is not directly related to the present invention and hence detailed description thereof is omitted. Such detection means has been known and it may be constructed by a cylindrical lens and a four-divided light detector. An automatic focusing control is effected by supplying the defocusing signal detected by the detection means 19 to an actuator (not shown) arranged around the lens 3 to move the lens 3 in the direction of an arrow 21. Numerals 20a and 20b denote the light receiving parts of the light detector for detecting the tracking error signal and a detail thereof is shown in FIG. 9. The two outputs from the light receiving 20a and 20b of light detector are differentiated by the differential amplifier 10 so that the tracking error signal is detected. This signal is supplied to the actuator (not shown) arranged around the lens 3 to move the lens 3 in the direction of an arrow 22 to effect a tracking control.

When the wavelength λ of the laser beam is 0.83 μm, the track pitch P is 1.6 μm, the numerical aperture N.A. of the lens 3 is 0.5 and the detection light flux diameter $\phi$ on the detection plane is 4.5 mm, then the distance D between the areas 13a and 13b is approximately equal to 0.3 mm. If the tracking error $\epsilon$ is 0.2 mm p-p ($\epsilon = \pm 0.1$ mm) at maximum, the maximum misalignment $\delta_m$ of the optical axis of the detection light is $2\epsilon = \pm 0.2$ mm. Thus, the areas 13a' and 13b' at which the detector is arranged when the misalignment of the optical axis of the detection light is taken into consideration are the areas enclosed by solid lines $\alpha$ and $\beta$ shown in FIG. 9. Accordingly, the light receiving parts 20a and 20b of the light detector used in the apparatus of FIG. 8 should have shapes which fall within the areas enclosed by the solid lines $\alpha$ and $\beta$ of FIG. 9. In the present embodiment, the light detector having two rectangular light receiving planes of 0.5 mm × 2.0 mm size spaced by 2.3 mm as shown by hatched lines in FIG. 9 is used.

Figure 10A:
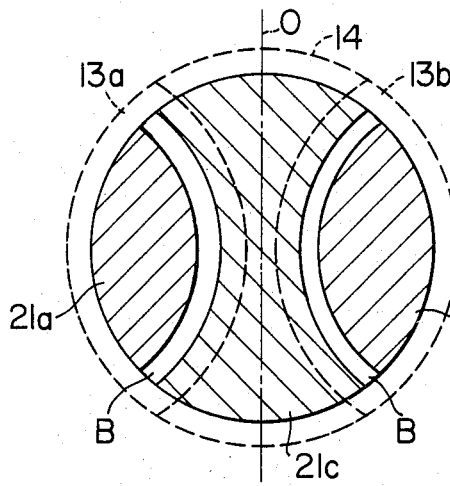
FIGS. 10a and 10b show other examples of the light detector.
Figure 10B:
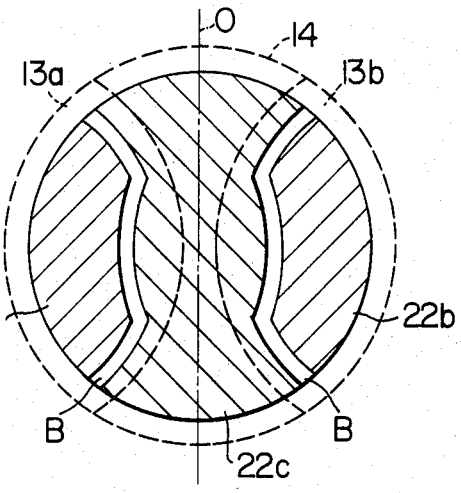

While two light receiving parts of the light detector are used in the above embodiment, the number of the light receiving is not limited to two. For example, as shown in FIGS. 10a and 10b, the shape of the light receiving planes of the light detector may be a circle having a slightly smaller diameter than the diameter of the detection light flux while taking the misalignment of the optical axis of the detection light into consideration and the light receiving plane may be divided into three parts (shown by hatched areas) by died zones B. In FIG. 10a, a difference between the outputs from the light receiving parts 21a and 21b is the tracking error signal, and a sum of the outputs from the light receiving parts 21a, 21b and 21c is the reproduced signal of the information recorded on the track. In FIG. 10b, a difference between the outputs from the light receiving parts 22a and 22b is the tracking error signal and a sum of the outputs from the light receiving parts 22a, 22b and 22c is the reproduced signal of the information like in FIG. 10a. Since the light receiving part 22c is expanded at the center thereof, the reproduced signal of the information can be obtained only from the output from the light receiving part 22c. It can be applicable to a case where an overlap area of the +1-order diffracted light ray and the −1-order diffracted light ray exists as shown in FIG. 5. In FIGS. 10a and 10b, since the light receiving parts 21a and 21b or 22a and 22b for detecting the tracking error signal are of the shape which is in accordance with the areas 13a and 13b, they may be of large size and the tracking error signal and the information reproduced signal can be provided by one detector. A symbol 0 in FIGS. 10a and 10b denotes an axis of symmetry of the light detector and the light detector is arranged such that the axis of symmetry 0 is substantially parallel to the track direction.

As described hereinabove, according to the present invention, since the light receiving parts of the light detector for detecting the tracking error signal detects only the change in the light intensity due to the interference between the 0-order diffracted light ray and the ±1-order diffracted light rays, the tracking error signal can be stably detected even if the track pitch is smaller than the light spot diameter and hence high density information recording and reproducing is attained. Even if the misalignment of the optical axis of the detection light is included, the tracking error signal is correctly detected so that stable and exact tracking control is attained.

We claim:

1. An optical track position detecting apparatus comprising a light source, optical means for directing a light flux from said light source to a track on a predetermined recording plane as a focused spot through an optical focusing element, a light detector for detecting a reflected light flux from said track and detection means for detecting a deviation between said focused spot and said track on the basis of an output signal from said light detector, wherein said light detector has at least two light receiving parts arranged symmetrically with respect to a direction of said track, and said light receiving parts detect only changes in light intensity due to respective interferences between a 0-order diffracted light ray and ±1-order diffracted light rays in said reflected light flux, said light receiving parts being disposed within reduced portions of respective overlap areas of the 0-order diffracted light ray and the ±1-order diffracted light rays in said reflected light flux, each of said reduced portions being defined by parallelly shifting said overlap area in opposite directions perpendicularly to the direction of said track by a distance equal to a maximum misalignment of an optical axis of said reflected light flux.

2. An optical track position detecting apparatus according to claim 1, wherein said overlap areas are defined by respective overlap areas of a circle having a diameter $\phi$ centered at an optical axis of said reflected light flux and two circles having the diameter $\phi$ centered at two points, respectively, spaced in a direction perpendicular to the direction of said track by $$\left( \frac{\tan(\psi_1 - \theta)}{2 \tan \theta} + \frac{1}{2} \right) \phi,$$

said areas excluding an overlap area of said three circles, where $\phi$ is a diameter of said reflected light flux on the plane of said light detector, $\theta$ is an angle which meets a relation of $\sin \theta = \text{N.A.}$, $\psi_1$ is an angle which meets a relation of $\sin \psi_1 = \lambda/P$, N.A. is a numerical aperture of said optical focusing element, $\lambda$ is a wavelength of said light flux and P is a pitch of said track.

3. An optical processor comprising a light source, a disc-shaped information recording medium having a plurality of tracks, optical means for directing a light source to one of said tracks of said information recording medium as a focused spot through an optical focusing element, a light detector for detecting a reflected light flux from said track, detection means for detecting a deviation between said focused spot and said track on the basis of an output signal from said light detector, and tracking control means for controlling position of said focused spot in accordance with the output of said detection means so that said focused spot follows said track, wherein said light detector has at least two light receiving parts arranged symmetrically with respect to a direction of said track, said light receiving parts detect only changes in light intensity due to respective interferences between a 0-order diffracted light ray and ±1-order diffracted light rays in said reflected light flux, and said detection means detects said deviation based on a difference between the outputs from said two light receiving parts, said light receiving parts being disposed within reduced portions of respective overlap areas of the 0-order diffracted light ray and the ±1-order diffracted light rays in said reflected light flux, each of said reduced portions being defined by parallelly shifting said overlap area in opposite directions perpendicularly to the direction of said track by a distance equal to a maximum misalignment of an optical axis of said reflected light flux.

4. An optical information processor according to claim 3, wherein said overlap areas are defined by respective overlap areas of a circle having a diameter $\phi$ centered at an optical axis of said reflected light flux and two circles having the diameter $\phi$ centered at two points, respectively, spaced in a direction perpendicular to the direction of said track by $$\left( \frac{\tan(\psi_1 - \theta)}{2 \tan \theta} + \frac{1}{2} \right) \phi,$$

said areas excluding an overlap area of said three circles, where $\phi$ is a diameter of said reflected light flux on the plane of said light detector, $\theta$ is an angle which meets a relation of $\sin \theta = \text{N.A.}$, $\psi_1$ is an angle which meets a relation of $\sin \psi_1 = \lambda/P$, N.A. is a numerical aperture of said optical element, $\lambda$ is a wavelength of said light flux and P is a pitch of said track.

5. An optical information processor according to claim 3, wherein said light detector has an additional light receiving part arranged between said two light receiving parts whereby the information recorded on said track is detected by the output signals from said additional light receiving part and said two light receiving parts.

* * * * *